Jan. 20, 1959 W. A. MARTIN 2,869,445
CAMERA TURRET INDEXING MECHANISM
Filed Jan. 30, 1957 3 Sheets-Sheet 2
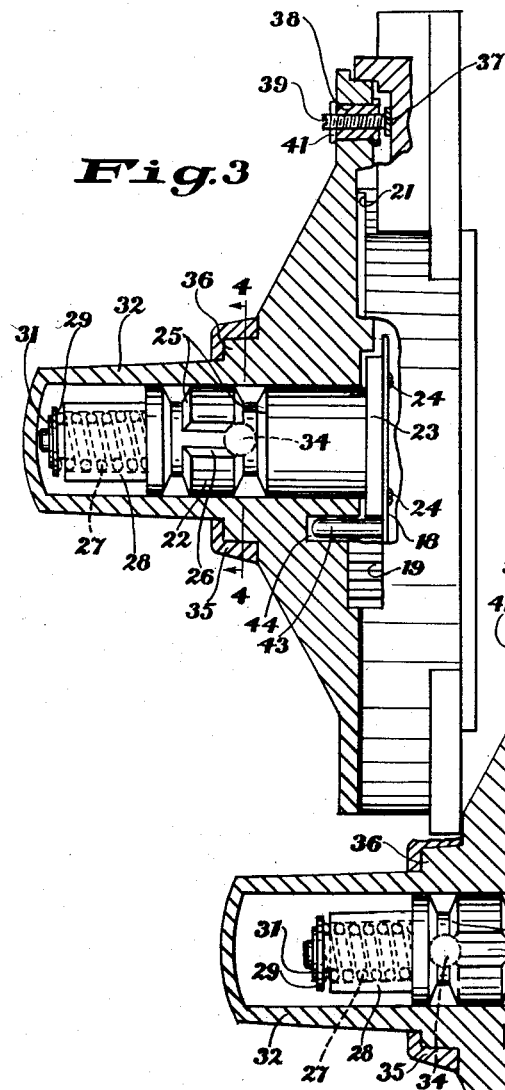
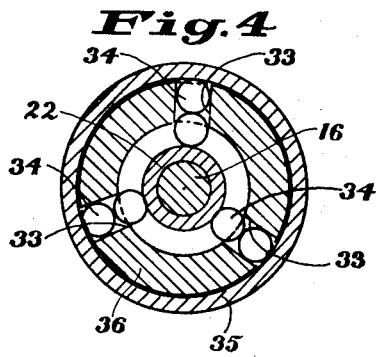
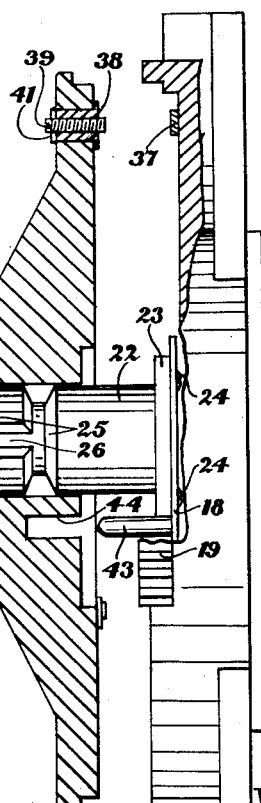
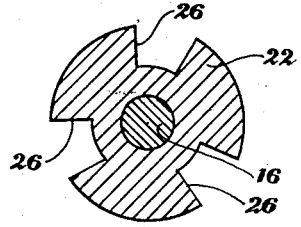
William A. Martin
INVENTOR.
BY
ATTORNEYS Jan. 20, 1959 W. A. MARTIN 2,869,445
CAMERA TURRET INDEXING MECHANISM
Filed Jan. 30, 1957 3 Sheets-Sheet 3
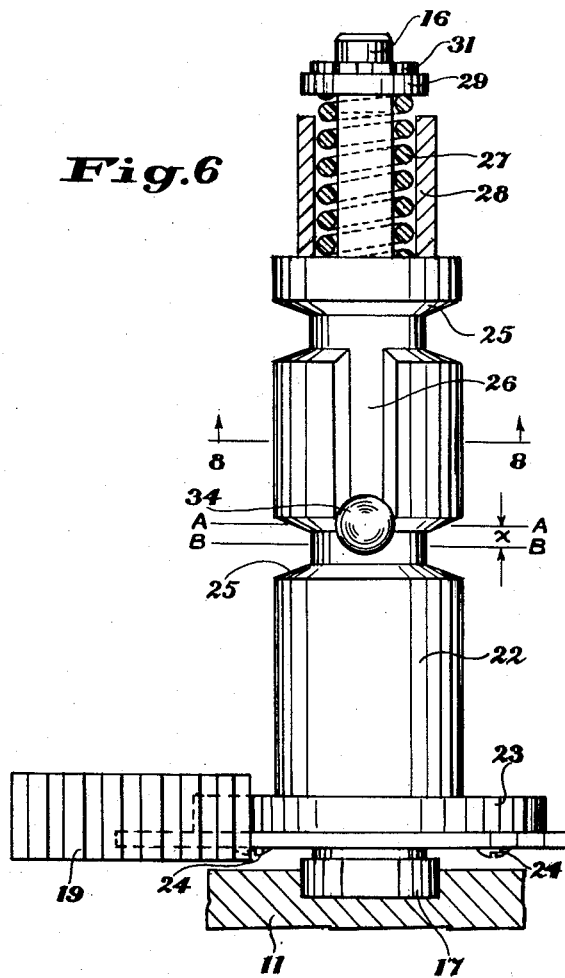
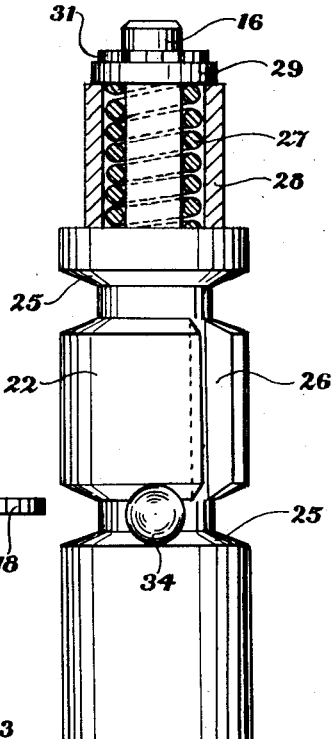
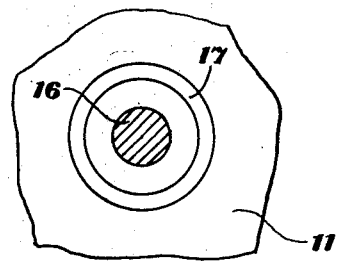
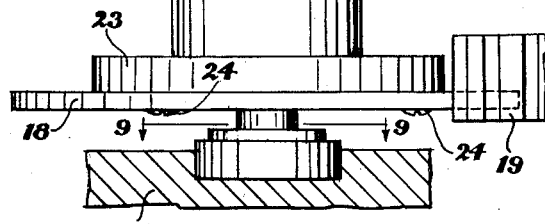
William A. Martin
INVENTOR.
BY
ATTORNEYS

United States Patent Office 2,869,445
Patented Jan. 20, 1959

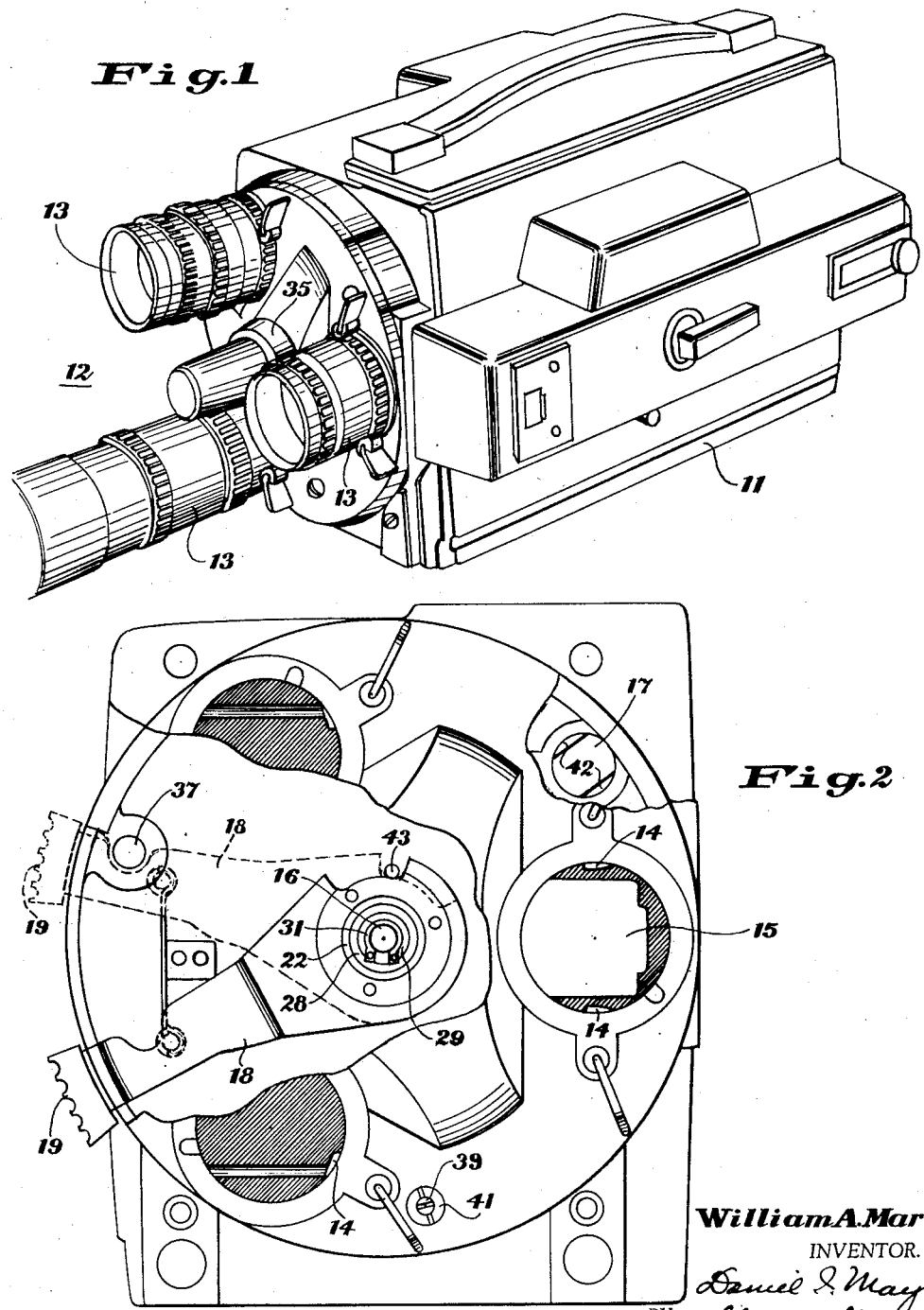

2,869,445

CAMERA TURRET INDEXING MECHANISM

William A. Martin, Rochester, N. Y., assignor to Eastman Kodak Company, Rochester, N. Y., a corporation of New Jersey Application January 30, 1957, Serial No. 637,172

13 Claims. (Cl. 95—45)

This invention relates generally to cameras and more specifically to a turret indexing mechanism for a camera adapted to selectively bring a plurality of objectives into and out of registration with a cooperating light-transmitting opening formed by the camera.

It is common practice to provide a camera with a turret indexing mechanism so that a plurality of optical elements, such as lenses, filters, screens, etc. can be selectively brought into and out of registration with a light-transmitting opening of the camera with ease and convenience and without necessitating interchanging lenses as required in the single lens mount camera. The satisfactory operating turret indexing mechanisms devised heretofore have been of complicated, costly construction, and have been unwieldy and difficult to operate, often requiring the utilization of a considerable amount of manually applied force to perform the turret indexing operation. Applicant's improved turret indexing mechanism is designed to obviate the foregoing disadvantages of the prior used mechanisms.

One of the principal objects of this invention, therefore, is to provide a simple, highly satisfactory, and inexpensive turret indexing mechanism for a camera which will provide effective locking of the turret with a selected objective in registration with the light-transmitting opening.

A further object of the invention is to provide an improved turret indexing mechanism for a camera that may be easily and readily manipulated with a minimum amount of manually applied force to selectively place the objectives in registration with the light-transmitting opening of the camera.

Still another object of the invention resides in the provision of a turret indexing mechanism for a camera for selectively positioning a plurality of objectives in operative position with a light-transmitting opening of a camera quickly, conveniently, and with precision.

One more object of the invention is to provide a turret indexing mechanism for a camera having means for positively preventing the turret from being disposed in an operative position when all of the objectives are out of registration with the light-transmitting opening of the camera.

Another object of this invention is the provision of an improved turret indexing mechanism for a camera having a locking means adapted to effectively lock the turret against axial movement and to urge the turret against the camera body.

Another object of the invention is the provision of focus-adjusting means carried by the turret for properly positioning the objective with respect to the film surface.

Objects and advantages other than those set forth above will be apparent from the following description when read in connection with the accompanying drawings, in which:

Fig. 1 is a perspective view of a camera embodying the invention;

Fig. 2 is an enlarged front elevation view partially in section of the camera of Fig. 1 with the objectives removed;

Fig. 3 is a side elevation view partially in section of the turret portion of the camera with the turret positioned in an operative picture taking position;

Fig. 4 is a section view taken along line 4—4 of Fig. 3;

Fig. 5 is a view similar to Fig. 3 showing the turret in an inoperative or withdrawn position;

Fig. 6 is an enlarged view of a portion of Fig. 3 showing the relative position of the stud, cam element, sleeve, spring and locking member with respect to the ball with the locking member in an "unlocked" position;

Fig. 7 is a view similar to Fig. 6 showing the relative position of the parts with the locking member in a "locked" position;

Fig. 8 is a section view taken along line 8—8 of Fig. 6; and

Fig. 9 is a section view taken along line 9—9 of Fig. 7.

As shown in the drawings, a preferred embodiment of this invention is illustrated as applied to a camera 11. The camera is provided with a turret 12 having a plurality of objectives 13 mounted thereto by spring urged camming elements 14 as seen in Fig. 2 engaging annular grooves, not shown, formed by the objectives 13. The turret 12 upon rotation is adapted to selectively position the objectives 13 in registration with a light-transmitting opening 15 of the camera 11.

The camera 11 is provided at its front end with a cylindrical axially extending post member shown as a stud 16 having a circular base 17 securely embedded in the camera body as seen in Figs. 6 and 7. A thin plate-like locking member 18 has one end forming an opening cooperating with the stud 16 so that the member 18 may be pivotally moved therearound by a handle 19 formed by the other end. The camera 11 is provided with a recessed portion which cooperates with the turret 12 to form an elongated slot 21 as seen in Fig. 3 for receiving the member 18 with the handle 19 thereof disposed outside of the turret 12 in a position readily accessible to the operator. An annular cam element 22 is disposed on the stud 16 and has a cylindrical flange 23 at one end thereof provided with tapped openings engageable by cap screws 24 insertable through openings carried by the locking member 18 for securing the cam element 22 and locking member 18 together. The cam element 22 is provided on its periphery with a passageway comprising a pair of parallel spaced-apart annular grooves 25 which are connected by circumferentially spaced, axially extending peripheral grooves 26. The axially extending grooves 26 are equidistantly spaced around the periphery of the cam element 22, and the number of such grooves are equal to the number of objectives 13 carried by the turret 12. A spring 27 is disposed on the stud 16 having one end engaging the cam element 22. A cylindrical sleeve 28 is concentrically placed over the spring 27 with one end thereof seated on the cam element 22, and the spring 27 and sleeve 28 retained on the stud 16 by means of a washer 29 and retaining element 31. The length of the sleeve 28 is slightly less than the axial distance between the washer 29 and the end of the cam element 22 to provide a clearance space permitting a limited axial movement of the cam element 22 and locking member 18 against the bias of the spring 27 for a purpose to be explained hereinafter.

The turret 12 is provided with an axially extending hub 32 for receiving the stud 16, sleeve 28 and cam element 22. The hub 32 is provided with circumferentially spaced, radially extending openings 33 as seen in Fig. 4 corresponding to the axial grooves 26 of the cam element 22. Steel balls 34 are disposed in the openings 33 and retained therein by an annular retaining ring 35 which seats on a shoulder 36 formed by the hub 32. When the turret hub 32 is disposed on the stud 16, the the steel balls 34 placed in the radial openings 33 and the retaining element 35 properly seated, the steel balls extend into the grooves 25, 26 and ride therein confining the turret 12 to rotatable and axial movement on the stud 16.

The camera 11 is provided with a focus-adjusting means comprising steel inserts 37 carried by the camera body to form seats. The turret 12 is provided with corresponding tapped bushings 38 and adjusting screws 39 are threaded therein with the ends of the screws adapted to engage the seats 37. By properly adjusting the screws 39, the distance existing between the objectives 13 and the film for proper focusing can be readily attained. Once the proper adjustment has been achieved, the screws 39 are locked in position by means of lock nuts 41. One of the inserts 37 is provided with spaced-apart flanges 42 as shown in Fig. 2 for receiving the end of one of the bushings 38 to provide a positive means for preventing rotative movement of the turret 12 after it has been axially moved inwardly into an operative, picture taking position with one of the objectives 13 in registration with the light-transmitting opening 15 of the camera.

Once the turret 12 is in an operative, picture taking position with the adjusting screws 39 engaging the corresponding seats 37 and one of the objectives 13 in registration with the light-transmitting opening 15 of the camera, the turret 12 may be quickly and effectively locked by pivotally moving the handle 19 on the locking member 18 from an "unlocked" position to a "locked" position as shown in Fig. 7. Pivotal movement of the locking member 18 through a predetermined angle causes the cam element 22 to be rotatably moved on the stud 16 while the turret 12 and steel balls 34 remain stationary. If the angle in degrees through which the locking member 18 and cam element 22 are rotated is any angle not equal to or a multiple of the number of degrees separating two successive objectives 13, the axially extending grooves 26 will always be out of registration with the steel balls 34 and any efforts to withdraw the turret 12 from the camera will be resisted by the spring 27. When the turret 12 is in the seated position, the steel balls 34 are disposed so that a plane A—A transverse to the stud axis and passing through the centers of the balls is axially displaced or misaligned a predetermined distance "X" from a plane B—B passing through the center of one of the annular grooves 25 as seen in Fig. 6. Consequently, pivotal movement of the locking member 18 into the "locked" position results in the cam element 22 being urged axially outwardly from the camera body by the steel balls 34 causing the spring 27 to be compressed which positively urges the turret 12 against the camera body. The cylindrical sleeve 28 limits the axial movement of the cam element 22 preventing the possibility of axially moving the turret 12 and cam element 22 outwardly by the application of a force exceeding the bias of the spring 27 a sufficient distance to withdraw the objective 13 from the light-transmitting opening 15 while the locking member 18 is in the "locked" position.

In order to assure proper seating of the turret 12 on the camera in an operative picture-taking position with the objective 13 in registration with the light-transmitting opening 15, the camera 11 is provided with an axially extending pin 43 adapted to be received by one of a series of openings 44 formed by the turret 12. Without this control, misalignment of the turret 12 is possible where the cam element 22 is turned by inadvertently placing the locking member 18 in the "locked" position while the turret 12 is in an inoperative or withdrawn position as shown in Fig. 5. In such a situation, turning the turret 12 so that the steel balls 34 disposed in the outermost annular groove 25 register with the axial grooves 26 and moving the turret axially inwardly positions the objectives 13 thereof out of registration with the light-transmitting opening 15. This is prevented by the pin 43 which in that position is out of register with the turret openings 44 thereby providing a positive means of preventing inward axial movement of the turret 12.

In the operation of this invention, let us assume initially that the locking member 18 is in a "locked" position as shown in Fig. 7 and the turret 12 is in an operative, picture-taking position with one of the objectives 13 in registration with the light-transmitting opening 15 of the camera 11. It is now desired to use a different objective. The locking member 18 is moved into the "unlocked" position as shown in Fig. 6 which rotates the cam element 22 causing the axial grooves 26 to register with the steel balls 34. The turret 12 is withdrawn axially into an inoperative position with the steel balls 34 moving axially along the grooves 26 until they reach the outermost annular groove 25 as seen in Fig. 5 where the forward motion of the balls 34 and turret 12 is stopped. The turret 12 while in the inoperative position is rotated through an angle equal to 360 degrees divided by the number of objectives 13 mounted on the turret 12 whereupon the balls 34 are once again in registration with the axial grooves 26 and one of the turret openings 44 in registration with the pin 43. The turret 12 is moved axially inwardly until the screws 39 engage the seats 37 as seen in Fig. 3 with a different objective 13 in registration with the light-transmitting opening 15 of the camera 11. The locking member 18 is moved to the "locked" position to lock the turret 12 with the desired objective 13 in an operative picture-taking position.

Although but one embodiment has been illustrated and described, it will be apparent to those skilled in the art that various changes and modifications may be made therein without departing from the spirit of the invention or from the scope of the appended claims.

It is claimed and desired to secure by Letters Patent:

1. In a camera having a light-transmitting opening, the combination of: a stud member carried by said camera; an annular cam element rotatably mounted on said stud, said cam element having axially spaced annular grooves connected by a plurality of axially extending peripheral grooves; a retaining element carried by said stud and axially spaced from said cam element; resilient means carried by said stud and interposed between said retaining element and said cam element; a cylindrical sleeve encircling said resilient means and having an axial length shorter than the axial distance between said retaining element and said cam element to permit axial movement of said cam element on said stud; a turret disposed on said stud and carrying a plurality of objectives; ball means carried by said turret complementary to and slidably receivable by said grooves whereby said turret is axially movable on said stud from an operative picture taking position with one of said objectives in registration with said light-transmitting opening to an inoperative position with said turret withdrawn from said camera, and rotatably movable on said stud in said inoperative position for selectively positioning said turret in said operative picture taking position with another one of said objectives in registration with said light-transmitting opening, said cam element when said turret is in said operative picture taking position having a plane passing through the center of one of said annular grooves misaligned a predetermined axial distance from a plane passing through the center of said ball means; and locking means secured to said cam element adapted to be moved into a "locked" position causing said cam element to be turned on said stud with said ball means axially urging said cam element said predetermined axial distance against the bias of said resilient means causing said turret to be urged against said camera.

2. In a camera having a light-transmitting opening, the combination of: a stud member carried by said camera; an annular cam element rotatably mounted on said stud, said cam element having axially spaced annular grooves connected by a plurality of axially extending peripheral grooves; a retaining element carried by said stud and axially spaced from said cam element; a spring carried by said stud and interposed between said retaining element and said element; a cylindrical sleeve encircling said spring and having an axial length shorter than the axial distance between said retaining element and said cam element to permit a predetermined amount of axial movement of said cam element on said stud; a turret disposed on said stud and carrying a plurality of objectives; ball means carried by said turret complementary to and slidably receivable by said grooves whereby said turret is axially movable on said stud from an operative picture taking position with one of said objectives in registration with said light-transmitting opening to an inoperative position with said turret withdrawn from said camera, and rotatably movable on said stud in said inoperative position for selectively positioning said turret in said operative picture taking position with another one of said objectives in registration with said light-transmtting opening, said cam element when said turret is in said operative position having a plane passing through the center of one of said annular grooves misaligned a predetermined axial distance from a plane passing through the center of said ball means; and locking means comprising an arm having one end secured to said cam element and the opposite end forming a handle, said locking means upon pivotal movement of said handle into a "locked" position when said turret is in said operative picture taking position causing said cam element to be turned on said stud with said ball means axially urging said cam element said predetermined axial distance against the bias of said spring causing said turret to be urged against said camera.

3. In a camera having a light-transmitting opening, the combination of: a stud member carried by said camera; an annular cam element rotatably mounted on said stud, said cam element having axially spaced annular grooves connected by a plurality of axially extending peripheral grooves; a retaining element carried by said stud and axially spaced from said cam element; a spring carried by said stud and interposed between said retaining element and said cam element; a cylindrical sleeve encircling said spring and having an axial length shorter than the axial distance between said retaining element and said cam element to permit a predetermined amount of axial movement of said cam element on said stud; a turret carrying a plurality of objectives adapted to be disposed on said stud; ball means carried by said turret complementary to and slidably receivable by said grooves whereby said turret is axially movable on said stud from an operative picture taking position with one of said objectives in registration with said light-transmitting opening to an inoperative position with said turret withdrawn from said camera, and rotatably movable on said stud in said inoperative position for selectively positioning said turret in said operative picture taking position with another one of said objectives in registration with said light-transmitting opening; seat means carried by said camera; adjusting screw means carried by said turret adapted to engage said seat means when said turret is in said operative picture-taking position to properly adjust the focus of said objectives, said cam element when said screw means engage said seat means having a plane passing through the center of one of said annular grooves misaligned a predetermined axial distance from a plane passing through the center of said ball means; and locking means comprising an arm having one end secured to said cam element and the opposite end forming a handle, said locking means upon pivotal movement of said handle into a "locked" position when said turret is in said operative picture taking position causing said cam element to be turned on said stud with said ball means axially urging said cam element said predetermined axial distance against the bias of said spring resulting in a force being exerted on said turret urging said adjusting screw means into engagement with said seat means.

4. In a camera having a light-transmitting opening, the combination of: an axially extending stud member carried by said camera; an annular cam element rotatably mounted on said stud, said cam element having axially spaced annular grooves connected by a plurality of axially extending peripheral grooves; a retaining element carried by said stud and axially spaced from said cam element; a spring carried by said stud and interposed between said retaining element and said cam element; a cylindrical sleeve concentric to and surrounding said spring interposed between said retaining element and said cam element, said sleeve having an axial length shorter than the axial distance between said retaining element and said cam element to permit a predetermined amount of axial movement of said cam element on said stud; a turret carrying a plurality of objectives and having a hub adapted to be disposed on said stud, said hub forming a plurality of radially extending openings; ball means disposed in said openings complementary to and slidably receivable by said grooves whereby said turret is axially movable on said stud from an operative picture taking position with one of said objectives in registration with said light-transmitting opening to an inoperative position with said turret withdrawn from said camera, and rotatably movable on said stud in said inoperative position for selectively positioning said turret in said operative picture taking position with another one of said objectives in registration with said light-transmitting openings; a retaining ring disposed on said hub for holding said ball means in engagement with said grooves; seat means carried by said camera; adjusting screw means carried by said turret adapted to engage said seat means when said turret is in said operative picture-taking position to properly adjust the focus of said objectives, said cam element when said screw means engage said seat means having a plane passing through the center of one of said annular grooves misaligned a predetermined axial distance from a plane passing through the center of said ball means; and locking means comprising an arm having one end secured to said cam element and the opposite end forming a handle, said locking means upon pivotal movement of said handle into a "locked" position when said turret is in said operative picture taking position causing said cam element to be turned on said stud with said ball means axially urging said cam element said predetermined axial distance against the bias of said spring resulting in a force being exerted on said turret urging said adjusting screw means into engagement with said seat means.

5. In a camera having a light-transmitting opening, the combination of: a stud member carried by said camera; a first member mounted on said stud member and adapted to be axially and rotatably movable thereon; means interposed between said first and stud members for resiliently biasing said first member against said camera; a second member slidably mounted on said first member and adapted to carry a plurality of objectives, one of said first and second members having axially spaced annular grooves connected by a plurality of axially extending peripheral grooves; means carried by the other of said first and second members complimentary to and slidably receivable by said grooves whereby said second member is (1) axially movable outwardly on said first member when said second recited means are in register with said axially extending grooves from an operative picture taking position with one of said objectives in registration with said light-transmitting opening to an inoperative position in which said second recited means is in registration with one of said annular grooves, (2) is rotatably movable on said first member while in said inoperative position with said second recited means riding in said one of said annular grooves until said second recited means again registers with said axially extending grooves, and (3) is axially movable inwardly into said operative picture taking position with said second recited means riding in said axially extending grooves to position another one of said objectives in registration with said light-transmitting opening, said second recited means being laterally misaligned from the other one of said annular grooves when said second member is in said operative picture taking position; and means adapted to turn said first member on said stud member while said second member is in said picture taking position causing said second recited means to ride in the other one of said annular grooves placing said axially extending grooves out of registration with said second recited means, said first member being urged axially outwardly against the bias of said first recited means by said second recited means causing said first recited means to urge said second recited means and second member against said camera.

6. The invention as defined in claim 5 wherein said first recited means comprises a spring interposed between a retaining element carried by said stud member and one end of said first member.

7. The invention as defined in claim 5 wherein said second recited means comprises a projection complementary to and receivable by said grooves.

8. The invention as defined in claim 5 wherein said last recited means comprises an arm having one end secured to said first member and the opposite end forming a handle.

9. In a camera having a light-transmitting opening, the combination of: a stud member carried by said camera; an annular cam element rotatably mounted on said stud member and having axially spaced annular grooves connected by a plurality of axially extending peripheral grooves; means interposed between said cam element and said stud member for resiliently biasing said cam element against said camera; a turret rotatably mounted on said cam element; means carried by said turret complementary to and slidably receivable by said grooves whereby said turret is (1) axially movable outwardly on said cam element when said first recited means are in register with said axially extending grooves from an operative picture taking position with one of said objectives in registration with said light-transmitting open-ing to an inoperative position with said turret withdrawn until said first recited means strikes the edge of one of said annular grooves, (2) is rotatably movable on said cam element while in said inoperative position with said second recited means riding in said one of said annular grooves until said second recited means again registers with said axially extending grooves, and (3) is axially movable inwardly with said second recited means riding in said axially extending grooves into said operative picture taking position with another one of said objectives in registration with said light-transmitting opening, said second recited means being laterally misaligned from the other one of said annular grooves when said turret is in said operative picture taking position; and means adapted to rotatably move said cam element while said turret is in said operative picture taking position causing said second recited means to ride in said other one of said annular grooves placing said axially extending grooves out of registration with said second recited means, said cam element being urged axially outwardly against the bias of said resilient means by said second recited means causing said resilient means to urge said second recited means and turret against said camera.

10. The invention as defined in claim 9 wherein said first recited means comprises a spring interposed between a retaining element carried by said stud member and one end of said first member.

11. The invention as defined in claim 9 wherein said turret is provided with a plurality of radially extending openings and said second recited means comprises balls disposed in said openings.

12. The invention as defined in claim 9 wherein said last recited means comprises an arm having one end secured to said first member and the opposite end forming a handle.

13. The invention as defined in claim 10 wherein a sleeve encircles said spring and has an axial length shorter than the axial distance between said retaining element and said first member to permit a predetermined amount of axial movement of said first member on said stud member.

References Cited in the file of this patent

UNITED STATES PATENTS

| | | |
|---|---|---|
| 1,798,634 | Schafer | Mar. 31, 1931 |
| 1,818,062 | Howell | Aug. 11, 1931 |
| 2,236,069 | Robinton | Mar. 25, 1941 |
| 2,510,360 | Zuber | June 6, 1950 |
| 2,720,145 | Goodfellow | Oct. 11, 1955 |